3,259,652
OXIDATION OF ACROLEIN OR METHACROLEIN TO THE CORRESPONDING ACID IN THE PRESENCE OF AN Sn-Sb-Mo CATALYST
Wolfgang M. H. Sachtler and Hervey H. Voge, Berkeley, and Lloyd B. Ryland, El Cerrito, Calif., assignors to Shell Oil Company, New York, N.Y., a corporation of Delaware
No Drawing. Filed Mar. 31, 1961, Ser. No. 99,714
7 Claims. (Cl. 260—530)

This invention relates to the production of unsaturated carboxylic acids. The invention relates more particularly to the production of acrylic and methacrylic acids by catalytic vapor phase oxidation of the corresponding alpha, beta-unsaturated aldehydes.

A potential source of alpha,beta-unsaturated aliphatic carboxylic acids, such as, for example, acrylic and methacrylic acids, are the alpha,beta-unsaturated aliphatic aldehydes corresponding thereto. Controlled catalytic oxidation of the unsaturated aldehydes to the desired acids has heretofore presented difficulties, however, militating against its efficient practical scale application. The very reactive nature of these unsaturated aldehydes, as well as of the acid products, often results in substantial conversion of these materials to undesired by-products under the conditions generally prevailing in vapor phase operations disclosed heretofore. At elevated temperatures acrylic acid, for example, is readily decomposed. In the presence of most oxidation catalysts this tendency is generally increased so that in their presence at conditions prescribed heretofore the rate for reactions involving decomposition of the acrylic acid approaches, and often exceeds, that of its formation. Catalysts disclosed heretofore as suitable for the controlled oxidation reaction often do not permit any substantial degree of variation in their composition without also incurring increased tendency toward runaway temperature conditions during the course of their use. The additional procedural steps necessitated in the production of such catalysts, and in their control during use, adds materially to the overall cost of the process. Under such conditions, generally prevailing in processes disclosed heretofore, the controlled oxidation of alpha, beta-unsaturated aldehydes with a selectivity to the desired unsaturated acids commensurate with practical scale operation, has therefore often been difficult if at all possible.

It is, therefore, an object of the present invention to provide an improved process enabling the more efficient production of unsaturated carboxylic acids by catalytic oxidation in the vapor phase of the corresponding unsaturated aldehydes wherein the above difficulties are obviated to at least a substantial degree.

Another object of the present invention is the provision of an improved process enabling the more efficient production of acrylic and methacrylic acids by the vapor phase catalytic oxidation of acrolein and methacrolein respectively, in the presence of a combination catalyst enabling the attainment of high selectivity to the desired unsaturated acids.

A more particular object of the present invention is the provision of an improved process enabling the more efficient production of acrylic acid by the catalytic, controlled oxidation of acrolein in vapor phase in the presence of an improved combination catalyst. Other objects and advantages of the present invention will become apparent from the following detailed description thereof.

In accordance with the invention alpha,beta-unsaturated aliphatic carboxylic acids such as, for example, acrylic and methacrylic acids, are obtained with substantially improved efficiency by reacting the corresponding alpha,beta-unsaturated aliphatic aldehydes, for example, acrolein and methacrolein, respectively, with oxygen in the presence of a combination catalyst consisting essentially of the combination of oxides of molybdenum, tin and antimony. Alpha,beta-unsaturated aliphatic aldehydes, such as, for example, acrolein and methacrolein, employed as charge to the process of the invention may be obtained from any suitable source. They may be obtained by catalytic vapor phase oxidation of the corresponding olefins. The invention is, however, not limited to the utilization of an unsaturated aldehyde obtained from any particular source. The unsaturated aldehyde need not necessarily be pure, and may contain admixed components generally present in this material as commercially available. A suitable charge to the process comprises the crude oxidation products obtained in the catalytic controlled oxidation of olefins to unsaturated aldehydes, as, for example, the crude acrolein-containing oxidation products obtained in the catalytic oxidation of propylene in the presence of suitable catalysts. An acrolein charge to the process may comprise admixed therewith, for example, hydrocarbons such as normally gaseous saturated and/or unsaturated hydrocarbons as propane, propylene, etc., as well as inert gases such as, for example, hydrogen, nitrogen, argon, etc. Such normally gaseous hydrocarbon and/or inert gases may be introduced from an outside source or may be recycled in part, or in their entirety, from within the system.

The molecular oxygen reactant may be introduced into the system as relatively pure oxygen, or as a diluted oxygen stream containing the oxygen in admixture with one or more normally gaseous materials such as nitrogen, argon, oxides of carbon, etc. Air may suitably be used as the oxygen-containing charge to the system.

Reaction of alpha,beta-unsaturated aliphatic aldehyde with molecular oxygen in accordance with the invention is carried out in the presence of a solid combination catalyst consisting essentially of tin, antimony, molybdenum and oxygen. Essential to the attainment of the objects of the invention is the presence of each of these components in the combination catalyst. Suitable catalysts comprise those wherein all these components are present in chemical combination as well as those wherein the metal components are present as a physical admixture of oxides of all three metal components. Suitable catalysts furthermore comprise the heterogeneous combinations containing both such chemical combinations and physical admixtures of the essential components. The catalysts of the invention are true combination catalysts, wherein each of the three essential metal components, in the form of an oxide or an oxygen-containing combination with one or more of the other metal components, exerts a true synergistic effect. Though the ratio of these components to one another may vary widely within the scope of the invention, it is essential that each be present to obtain the objects of the invention. In general, the suitable catalysts contain each of the three metal components in an amount equal to from about 5 to about 50% by weight (calculated as metal) of the total combined weight of tin, antimony and molybdenum (calculated as metal) in the combination catalyst. The oxygen content of the catalysts may vary widely depending upon the valence state of the metals combined therewith and the specific manner in which the metal components and oxygen are combined. Furthermore, the initial oxygen content is generally not critical since the catalyst combination rapidly reaches a steady state of oxidation during its use. Oxygen is always present in an amount sufficient to assure the presence of all metal components of the combination catalysts in a form involving chemical combination with oxygen. The suitable catalyst combinations may contain each of the essential metal constituents in a single valence state or in more than one valence state. Thus, the suitable catalyst combinations may contain antimony in the form of one or more oxides wherein this metal is tri-, tetra-, or pentavalent. The tin component may be present, for example, in the form of one or more oxides wherein it is divalent or tetravalent. At least a part of the metal components of the catalysts may be present in combination with oxygen as acids.

Particularly effective catalysts comprise those catalyst combinations wherein the combined number of atoms of antimony and of tin are equal to the total number of atoms of molybdenum therein. This is exemplified by tin antimony molybdate compositions represented by the formulae: $2SnO_2Sb_2O_3 \cdot 4MoO_3$; $3SnO_2 \cdot 4\frac{1}{2}Sb_2O_3 \cdot 12MoO_3$;

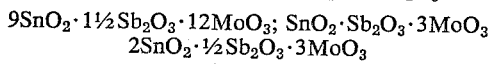

$9SnO_2 \cdot 1\frac{1}{2}Sb_2O_3 \cdot 12MoO_3$; $SnO_2 \cdot Sb_2O_3 \cdot 3MoO_3$
$2SnO_2 \cdot \frac{1}{2}Sb_2O_3 \cdot 3MoO_3$ It will be understood, however, that this is not an essential requirement. A particular advantage of the invention resides in the fact that the relative proportions of each of the components in the combination catalysts employed may vary widely within the scope of the invention. The combination catalysts need therefore not be prepared in a manner resulting in compositions within narrow limits to obtain their beneficial effect in the process of the invention. This greatly reduces the cost and operative procedures involved in preparing the suitable catalysts.

The suitable catalyst combinations may be prepared by physically admixing the oxides, hydroxides, hydrous oxides, or acids of tin, antimony and molygdenum. The individual oxides may be admixed in the dry state or they may be combined with the aid of suitable liquids to result in the formation of a slurry, suspension, paste, or the like, of the mixed oxides, which is thereupon freed to the excess liquid, dried, and calcined. In general, a suitable liquid for this purpose is water. It is preferable to use freshly precipitated oxides. Other methods for preparation comprise the thermal decomposition of suitable compounds of tin, antimony and molybdenum. The thermal decomposition may be applied to each of the compounds separately and the products combined, or the starting compounds may be mixed and the resulting mixture subjected to thermal decomposition. The resulting products of the decomposition step may be treated in an oxygen-containing atmosphere and subsequently calcined.

A suitable method for preparing tin-antimony-molybdate catalyst compositions is that wherein an acidic aqueous solution of a water soluble antimony compound such as, for example, antimony trichloride, is combined with an aqueous solution of a water soluble compound of tin such as, for example, a tin chloride. To the resulting admixture there is added a solution of a compound of molybdenum capable of yielding molybdenum oxide, such as ammonium molybdate (usually called "molybdic acid 85%" in commerce). Ammonium hydroxide is preferably added to the mixture to result in a hydrogen ion concentration in terms of pH values of at least 6. Heating, agitation and/or storage of the reaction mixture during the course of this procedure may be resorted to. The resulting precipitate formed is separated from its solution by conventional means such as filtration, evaporation, and the like, and dried. Drying may be carried out in air or in an inert atmosphere such as, for example, nitrogen or the like. The resulting dried material is calcined. Suitable catalysts are prepared in a similar manner employing antimony nitrate or antimonyl nitrate solutions, and stannic or stannous nitrate solutions as starting materials; combining them; adding ammonium molybdate thereto and ammonia as necessary; and then dehydrating, drying and calcining the resulting precipitate. A still further example of a method of preparing suitable combination catalysts comprises the mixing of alkali stannates and antimonates or pyroantimonates in alkaline solution, precipitating by acidification, and adding an oxide of molybdenum or molybdenum oxide-yielding compound, to the resulting precipitate, and thereafter proceeding with drying and calcining of the precipitate. Alternatively, the molybdenum compound may be added to the tin and antimony-containing solution prior to acidification. It is to be understood that in the preparation of the combination catalysts of the present invention any oxidation state of the tin, antimony, and molybdenum can be used in the catalyst preparation, since in the process of calcination and/or use, the combination catalyst is converted to a form effective in the process of the invention. Treatment of the finished combination catalysts by subjection to an elevated temperature in an oxidizing atmosphere may be employed before use of the catalyst. This step is, however, not essential to the execution of the process of the invention. Other methods resulting in the formation of admixtures of the oxides of tin, antimony and molybdenum may be used to obtain the catalyst combinations to be used in the process of the invention.

The combination catalysts may be employed as such, or they may be used in combination with a suitable support material. A particularly preferred support material comprises silica. The amount of silica support material combined with the catalyst combination may vary widely within the scope of the invention. Suitable catalysts are obtained by combining the silica support with the catalyst combination in proportions resulting in admixtures containing from about 10 to about 75% silica and preferably from about 35 to 65% silica. The percentages are by weight of the total mixture. Greater or lesser amounts of the support material may, however, be used within the scope of the invention. Silica it has been found exerts a decidedly beneficial effect upon the activity of the catalyst.

Although silica is shown as a preferred support material, it is to be understood that other catalysts support materials may replace a part or all of the silica in the catalyst combinations. Other suitable support materials comprise any of the known silicious and/or aluminous support materials. Examples of such supports are the various aluminas, silica-alumina, clays, Carborundum, Alundum, silicon carbide, argillaceous supports, crushed fire brick, porcelain, pumice, bonded silica sand and the like. Supports of low surface area are generally preferred.

When the catalyst combinations are employed in combination with a suitable support material, such support material may be combined with the combination catalyst during the course of its preparation or after its preparation. Thus, the catalyst support may be combined by physical admixture with the calcined combination of oxides of tin, antimony, and molybdenum. Such physical admixture may be made in the dry state or may be carried out with the aid of liquids to form a slurry, suspension or paste of the catalyst combination which is then combined with the suitable support, and the resulting admixture dried and calcined. The support materials are often advantageously incorporated with the catalyst prior to calcining of the mixed oxides. Comprised within the scope of the invention is the addition of the suitable support materials during the process of formation of the oxides. Thus, in the preparation of a catalyst comprising silica, the silica, for example, a silica sol, may be combined with the aqueous solution of antimony and/or tin compounds used as starting materials in the preparation of the catalyst. It is to be understood, however, that the invention is in no wise limited by the means resorted to in effecting the combination of the catalyst combinations with a suitable support material.

An advantage of the process of the invention resides in its ability to effect the reaction of molecular oxygen with the unsaturated aldehyde with high selectivity to unsaturated acid at relatively low temperatures, thereby enabling the reaction to be carried out well below temperature conditions at which any substantial decomposition of acrylic acid is encountered. A particular advantage inherent in the invention resides in the fact that, quite contrary to the general behavior of catalysts disclosed heretofore for this reaction, use of the combination catalysts employed in the process of the invention does not result in any substantial decrease in selectivity to unsaturated acid with increase in temperature in the temperature range encompassing their optimum activity. This permits substantially greater freedom with respect to variation in temperature conditions without fear of encountering run-away conditions with concomitant loss of product and destruction of catalyst. This attribute of the catalyst is of particular value in a process wherein charge material and product both possess high reactivity, particularly under oxidizing conditions.

The catalyst combinations employed in the process of the invention may be regenerated after use by treatment with oxygen-containing gas at elevated temperatures. Treatment with oxygen in the absence of organic feed may also be resorted to intermittently during the course of the process. Since components of the catalyst may be slightly volatile at times, depending upon conditions prevailing during their use, and their prolonged use may cause some depletion in one or more, but particularly antimony, we also envisage continuous or intermittent introduction of a metal-containing compound into the system during a reaction and/or catalyst regeneration stage of the process. The metal-containing compound may be introduced into the system together with the charge, with the aid of a separate gaseous entraining medium, or by other conventional means. The process of the invention may be carried out in batch, semi-continuous or continuous operation. The process lends itself readily, however, to efficient continuous operation. The catalyst may be employed in the form of a fixed bed, or in fluidized or suspended form.

The controlled catalytic oxidation is executed at a temperature in the range of from about 200 to about 550° C. and preferably from about 300 to about 500° C. The use of a temperature in the range of from about 350 to about 435 is particularly preferred.

The process may be carried out at subatmospheric, atmospheric, or superatmospheric pressures. In general, it is preferred to use a pressure in the range of from about atmospheric to moderately elevated pressures, for example, up to 150 p.s.i.g. Higher or lower pressures may, however, be employed within the scope of the invention.

Contact times in the range of, for example, from about 0.1 to about 150 seconds, and preferably from about 0.25 to about 5 seconds are satisfactory. However, shorter or longer contact times may be resorted to within the scope of the invention. Instead of contact time, we may speak of gaseous hourly space velocity (GHSV), which is the volume of total feed gas (at STP) per volume of catalyst per hour. Preferable values are 300 to 6000 GHSV.

Introduction of reactants into the reaction zone is controlled to maintain the mol ratio of oxygen to unsaturated aldehyde entering the reaction zone of from about 0.25:1 to about 50:1 and preferably from about 0.5:1 to about 5:1. The use of oxygen in amounts slightly less than equimolar amounts is, however, generally particularly preferred, i.e., $O_2$/acrolein 0.8:1. Departure from these preferred proportions is, however, included within the scope of the invention. Maintenance of the desired ratios of feed components may be facilitated by control of the recycle of materials from within the system and also by controlled separation of components from such recycled materials and/or from materials charged to the system from an outside source.

Temperature, flow rate, and water content of feed should be mutually adjusted in a manner obvious to one skilled in the art so as to obtain a conversion in the desired range, e.g., 50–90%.

Reactants and/or recycled streams may be subjected to conventional purification or concentrating means comprising, for example, one or more such steps as distillation, fractionation, filtration, adsorption, absorption, extractive distillation, solvent extraction, and the like.

Reactants may be charged in separate streams, or they may be combined before introduction into the reaction zone. Reactants may be introduced at a plurality of points along the length of the reaction zone.

Water is preferably introduced into the reaction zone. Such water is preferably in the vapor phase before entering the reaction zone proper. The water may be introduced into the reaction zone in a mol ratio of water to unsaturated aldehyde in the charge in the range of from about 0.25:1 to about 25:1, and preferably in the range of from about 3:1 to about 10:1. Greater or lesser amounts of water may be introduced into the reaction zone, however, within the scope of the invention.

The desired acrylic acid is separated from the reactor effluent stream by conventional means. These may comprise one or more such steps as, for example, absorption, distillation, extractive distillation, fractionation, solvent extraction, and the like. Unreacted aldehyde, optionally together with any normally gaseous saturated and unsaturated hydrocarbons present, as well as inert gas, such as, for example, nitrogen, hydrogen, argon and the like, may be recycled, in part or in entirety, to the reaction zone. A part of such recycled stream is preferably bled from the system. Recycle and/or bleed streams may be subjected to conventional processing steps to effect the separation and recovery of components therefrom. Such recovered component may be subjected to further oxidation in separate reaction steps or may be recycled separately to the reaction zone of the process.

Suitable means are preferably resorted to to effect relatively rapid cooling of the reactor effluence. Thus, the effluent stream from the reactor may be quenched by direct contact with suitable quenching media. Generally water is satisfactory, although other cooling liquids, comprising, for example, hydrocarbons, may be employed for this purpose within the scope of the invention.

"Percent selectivity to acrylic acid" as used herein is defined as 100 times the number of moles of acrylic acid produced divided by the total number of moles of acrolein in the charge converted.

The following examples are illustrative of the invention:

*Example I*

A combination catalyst "A" consisting essentially of a combination of oxides of tin, antimony and molybdenum was prepared by combining an aqueous suspension, prepared by adding 22.8 grams of antimony trichloride to 500 cc. of water, with 500 cc. of an aqueous solution of stannous chloride containing 22.6 grams of $$SnCl_2 \cdot 2H_2O$$

To the resulting mixture there was added one liter of aqueous ammonium molybdate containing 0.2 mole of Mo. Aqueous ammonium hydroxide was added to the resulting mixture in sufficient amount to adjust the pH to a value of 6. The resulting admixture was then allowed to stand overnight and was then filtered on a Büchner funnel. The precipitate obtained was washed with water and dried in air at 110° C. The resulting dried material was calcined for a period of two hours at a temperature of 500° C. The calcined catalyst combination so obtained was broken up and a 10–20 mesh portion separated therefrom by screening. The resulting combination catalyst so obtained consisted essentially of a mixture of oxides of tin, antimony and molybdenum containing tin, antimony and molybdenum in the atomic ratio of 1:1:2, respectively, and may be represented by the formula 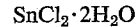$2SnO_2 \cdot Sb_2O_3 \cdot 4MoO_3$.

*Example II*

A combination catalyst "B" consisting essentially of a mixture of oxides of antimony, tin and molybdenum containing antimony, tin, and molybdenum in the atomic ratio of 9:3:12 was prepared under the identical conditions employed in the preparation of catalyst "A" of the foregoing Example I, but with the exception that the starting materials in this instance consisted of: 500 cc. aqueous suspension prepared from 34.2 grams $SbCl_3$, 500 cc. aqueous solution of tin chloride containing 11.3 grams $SnCl_2 \cdot 2H_2O$, and one liter of aqueous ammonium molybdate solution containing 0.2 mole Mo. The resulting catalyst combination may be represented by the formula: $4\frac{1}{2}Sb_2O_3 \cdot 3SnO_2 \cdot 12MoO_3$.

*Example III*

A combination catalyst "C" consisting essentially of a mixture of oxides of antimony, tin and molybdenum, containing antimony, tin and molybdenum in the atomic ratio of 3:9:12, respectively, was prepared under the substantially identical conditions used in the preparation of catalyst "A" of the foregoing Example I, but with the exception that the starting materials consisted of: 500 cc. of an aqueous suspension prepared from 11.4 grams of $SbCl_3$; 500 cc. of an aqueous solution containing 33.9 grams of $SnCl_2 \cdot 2H_2O$, and one liter of aqueous ammonium molybdate solution containing 0.2 mole of Mo.

*Example IV*

A combination catalyst "D" consisting essentially of a mixture of oxides of tin, antimony, molybdenum and silica, containing tin, antimony and molybdenum in the atomic ratio of 1:1:2, respectively, was prepared by combining 500 cc. of an aqueous suspension of antimony trichloride prepared from 22.8 grams $SbCl_3$ with 500 cc. aqueous solution of stannous chloride containing 22.6 grams $SnCl_2 \cdot 2H_2O$. To this mixture there was added one liter of aqueous solution of ammonium molybdate containing 0.2 mole of Mo. There was then added to the mixture 230 grams of a 31% silica sol (sold under the name of "Ludox"). Aqueous ammonium hydroxide was thereupon added to obtain a pH of 6. The resulting mixture was allowed to stand for eight hours. It was then filtered on a Büchner funnel. The precipitate was washed with water, dried at 120° C. in air and then calcined at 500° C. for a period of two hours. The calcined material was broken up and screened to obtain a 10–20 mesh portion. The finished combination catalyst contained tin, antimony and molybdenum in the atomic ratio of 1:1:2, respectively, as oxides; and contained silica in an amount equal to 50% by weight of the total catalyst composition. The finished catalyst composition may be represented by the general formula:

$$2SnO_2 \cdot Sb_2O_3 \cdot 4MoO_3/SiO_2$$

*Example V*

Acrylic acid was produced by passing a mixture of acrolein, oxygen, argon and steam over catalyst "A" at a temperature of 380° C. at substantially atmospheric pressure and a GHSV of 1500. Acrolein, oxygen, argon and steam were charged in a mol ratio of 1:0.8:4.3:3.6, respectively.

The operation was repeated in three additional separate experiments carried out under substantially identical conditions as the foregoing operation employing catalyst "A" but with the exception that the catalyst employed was varied; catalysts used being the catalysts "B," "C" and "D" of the foregoing Examples II, III, and IV, respectively.

The products obtained were analyzed in each of the operations. The results obtained in each of the operations are set forth in the following Table I in terms of total amount of acrolein converted and selectivity to acrylic acid obtained. Also indicated in Table I are the temperatures at which each reaction was executed.

As indicated in the foregoing, the effect of the individual metal oxide components in the catalyst combination are truly synergistic for the acrylic acid-producing reaction and not one may be omitted. For the purpose of comparison five additional operations were carried out under substantially identical conditions but with the exception that compositions "E," "F," "G," "H," "I," were substituted for catalysts of the invention. The results obtained in the presence of these materials in terms of total conversion of acrolein and of selectivity to acrylic acid, as well as the temperature at which the reaction was carried out, are also set forth for each of these comparative runs in the following Table I. The catalysts "E," "F," "G," "H," "I," are those indicated herein below in Example VI following Table I.

Antimony oxide alone, on silica, proved to be of exceedingly poor activity and the oxidation products obtained contained only negligible amounts of acrylic acid.

TABLE I

| Catalyst | Atomic Ratio, Sn:Sb:Mo in Catalyst | Max. Temp., °C. | Acrolein Converted, Percent | Selectivity to Acrylic Acid, Percent |
|---|---|---|---|---|
| "A" (Example I) | 1:1:2 | 380 | 61 | 74 |
| "B" (Example II) | 3:9:12 | 392 | 42 | 80 |
| "C" (Example III) | 9:3:12 | 435 | 85 | 63 |
| "D" (Example IV) contains 50% $SiO^2$ | 1:1:2 | 420 | 83 | 70 |
| "E" (Example VI) | 0:0:1 | 425 | 53 | 14 |
| "F" (Example VI) | 1:0:1 | 338 | 60 | 28 |
| "G" (Example VI) contains 50% $SiO^2$ | 0:1:2 | 462 | 28 | 42 |
| "H" (Example VI) | 1:1:0 | 437 | 20 | 7 |
| "I" (Example VI) contains 50% $SiO^2$ | 1:3:0 | 393 | 18 | 17 |

Similarly methacrylic acid was produced by reacting methacrolein with oxygen in the presence of the above-defined combination catalysts under the above-indicated conditions.

*Example VI*

Composition "E" consisted essentially of molybdenum oxide obtained as follows: 50.2 grams of ammonium molybdate (molybdic acid, 85% $MoO_3$) was dissolved in one liter of water and 30 ml. of concentrated ammonium hydroxide. To this was added 40 ml. of concentrated nitric acid. The precipitate that formed in a short time was collected on a filter, dried at 120° C., and calcined at 500° C.

Composition "F" consisted essentially of a mixture of oxides of tin, and molybdenum containing tin and molybdenum in an atomic ratio of 1:1, obtained by adding 1 liter of aqueous ammonium molybdate solution (0.1 mole Mo) to one liter of 0.1 molar stannic chloride and then adding 3 N ammonium hydroxide to adjust the pH to 7. The precipitate was collected on a filter, washed, dried at 120° C., ground, and the 10–20 mesh particles calcined at 500° C. for two hours.

Composition "G" consisted essentially of a mixture of oxides of antimony and molybdenum in combination with silica containing an atomic ratio of antimony to molybdenum of 1:2, obtained as follows: in a beaker 10.4 grams of antimony oxide was mixed with 24.2 grams of molybdic acid and 100 grams of silica sol ("Ludox"). The resulting slurry was concentrated to a thick gel by heating on a hot plate with stirring. It was dried at 120° C., ground and the 10–20 mesh particles calcined at 500° C.

Composition "H" consisted essentially of a mixture of oxides of antimony and tin, containing antimony and tin in an atomic ratio of 1:1 obtained by adding 45.6 grams of $SbCl_3$ (dissolved in 180 ml. of 3.8 N HCl) to 820 ml. of water. Then adding thereto 45.1 grams of $$SnCl_2 \cdot 2H_2O$$

dissolved in 100 grams of 1% hydrochloric acid. The resulting soft gel was diluted with 500 ml. of additional water, heated to 80° C. The pH was then adjusted to 6.5 by adding 3 N $NH_4OH$. The product was collected on a filter, washed with hot water and dried at 120° C. After grinding, the 10–20 mesh particles were calcined 2 hours at 500° C.

Composition "I" consisted essentially of a mixture of oxides of antimony and tin containing antimony and tin in the atomic ratio of 3:1 and containing silica in an amount equal to 50% by weight of the total composition. This material was prepared substantially in the same manner as that used in the preparation of Composition "H" but with the exception that 53.8 grams of $SbCl_5$ and 13.5 grams of $SnCl_2 \cdot 2H_2O$ were used, and 115 grams of silica sol ("Ludox") was added before the heating step.

We claim as our invention:

1. The process for the production of alpha,beta-unsaturated aliphatic carboxylic acids selected from the group consisting of acrylic acid and methacrylic acid which comprises reacting the corresponding alpha,beta-unsaturated aliphatic aldehyde selected from the group consisting of acrolein and methacrolein with uncombined molecular oxygen in the presence of a catalyst consisting essentially of tin, antimony and molybdenum in combination with oxygen, at a temperature of from about 200 to about 550° C., the content in said catalyst of each of said tin, antimony and molybdenum components being in the range of from about 5% to about 50% by weight of the combined weight of tin, antimony, and molybdenum in said catalyst calculated as metal.

2. The process for the production of acrylic acid which comprises reacting acrolein with uncombined molecular oxygen at a temperature of from about 300 to about 500° C. in the presence of a combination catalyst consisting essentially of an admixture of oxides of tin, antimony and molybdenum, the content in said catalyst of each of said tin, antimony and molybdenum components being in the range of from about 5% to about 50% by weight of the combined weight of tin, antimony, and molybdenum in said catalyst calculated as metal.

3. The process in accordance with claim 2 wherein said combination catalyst contains said oxides in an atomic ratio of tin to antimony to molybdenum of approximately 1:1:2 and the valence state of the molybdenum is 6.

4. The process in accordance with claim 2 wherein the combined total number of atoms of tin and antimony in said combination catalyst is substantially equal to the number of atoms of molybdenum contained therein, and the valence state of the molybdenum is six.

5. The process in accordance with claim 2 wherein said combination catalyst is used in combination with silica, and the valence state of the molybdenum is six.

6. The process for the production of acrylic acid which comprises passing acrolein in admixture with uncombined molecular oxygen and water vapor over a catalyst consisting essentially of the combined oxides of tin, antimony and molybdenum in the relative proportions defined by the general formula $2SnO_2 \cdot Sb_2O_3 \cdot 4MoO_3$ at a temperature of from about 300 to about 550° C.

7. The process in accordance with claim 6 wherein said combination catalyst is used in combination with silica.

References Cited by the Examiner

UNITED STATES PATENTS

| | | | |
|---|---|---|---|
| 2,744,928 | 5/1956 | Smith et al. | 260—530 |
| 2,881,212 | 4/1959 | Idol et al. | 260—530 |
| 2,881,213 | 4/1959 | Idol et al. | 260—530 |
| 3,087,964 | 4/1963 | Koch et al. | 260—530 |

OTHER REFERENCES

Berkman et al.: "Catalysis," page 785 (1940).

LORRAINE A. WEINBERGER, *Primary Examiner.*

LEON ZITVER, CHARLES B. PARKER,
*Examiners.*

G. P. D'ANGELO, I. R. PELLMAN,
*Assistant Examiners.*